UNITED STATES PATENT OFFICE.

GEORGE H. BLAKE, OF PORTLAND, MAINE.

IMPROVEMENT IN PROCESSES OF PREPARING MOSS.

Specification forming part of Letters Patent No. 183,281, dated October 17, 1876; application filed March 7, 1876.

*To all whom it may concern:*

Be it known that I, GEORGE HENRY BLAKE, of Portland, in the county of Cumberland and State of Maine, have invented certain new and useful Improvements in the Preparation of Moss, called the curing of the same, of which the following is a specification:

The present invention relates to the treatment and curing of moss, particularly that with long stems which is found so abundantly upon the trees in the Southern States, and generally known as hanging moss or southern moss, or by the botanical term *Tillandsia usneoides*, and consists in the process of expelling by artificial heat the moisture from the bark which encircles the fiber, so that the same, becoming very crisp and brittle, can be readily removed.

Heretofore in the treatment of this moss for the same purpose of releasing the fiber or heart from the bark it has been customary to use chemicals of various kinds and compositions, but, by my invention, I have been enabled to avoid all the danger, trouble, and expense of any and all such processes.

In carrying out my invention I have preferably prepared a suitable building or structure, provided with trays or like appliances to hold the moss. The said building should be of suitable character to protect the moss well, and should be provided with means or devices for heating it either by open stove, furnace, steam-pipe, hot-blast, or otherwise. The moss should be loosely placed on said trays or otherwise, to allow free circulation of the heat in, through, and about it. The building should be suitably adapted to allow the escape of the moisture arising from the process of drying.

The moss should be subjected to the heat in this manner from twelve to twenty-four hours, according to the dampness of it; but no fixed rule can be stated in this respect, as it will depend in a good measure on the particular condition of each drying—such as external temperature, heat in the apartment, and other like causes tending to make the period a little longer or shorter. I usually desire during a drying to keep up a continual temperature of about 100° Fahrenheit for, say, eighteen hours, more or less. In this way the moisture is perfectly expelled from the bark, and this becomes exceedingly brittle and friable, and in a very admirable condition to be easily and quickly removed from the fiber by being passed through the picker, or otherwise. And in all this I am enabled to preserve the integrity of the fiber and produce, where the bark has been charred off, a long and very hair-like looking article. This is readily prepared and colored for all the uses and purposes natural hair is put to for upholstery, stuffing mattresses, chairs, and the like, and usually when so prepared wears all the appearance of real or animal hair. But it is not an absolute necessity that it should be colored.

Having thus described my invention, what I consider new, and desire to secure by Letters Patent, is—

The process above described of treating hanging moss or southern moss by artificial heat, substantially as and for the purposes set forth.

In testimony that I claim the foregoing as my own I affix my signature in presence of two witnesses.

GEORGE HENRY BLAKE.

Witnesses:
W. PORTER,
THOS. C. AUSTIN.